United States Patent
Mullin

(10) Patent No.: US 10,285,380 B1
(45) Date of Patent: May 14, 2019

(54) SEMI-HOLLOW BALL WITH INTERNAL SUPPORT STRUCTURE AND AIRFLOW PASSAGES

(71) Applicant: Make Ideas, LLC, La Jolla, CA (US)

(72) Inventor: Keith Alan Mullin, La Jolla, CA (US)

(73) Assignee: Make Ideas, LLC, La Jolla, CA (US)

( * ) Notice: Subject to any disclaimer, the term of this patent is extended or adjusted under 35 U.S.C. 154(b) by 311 days.

(21) Appl. No.: 15/409,323

(22) Filed: Jan. 18, 2017

Related U.S. Application Data

(60) Provisional application No. 62/280,810, filed on Jan. 20, 2016.

(51) Int. Cl.
*A01K 15/02* (2006.01)

(52) U.S. Cl.
CPC .................................. *A01K 15/025* (2013.01)

(58) Field of Classification Search
CPC .. A01K 15/026; A01K 15/025; A01K 5/0114; A01K 15/02
USPC .... 119/709, 707, 710, 711, 51.01, 702, 708, 119/905; D30/160; 446/409, 475
See application file for complete search history.

(56) References Cited

U.S. PATENT DOCUMENTS

| | | | |
|---|---|---|---|
| 1,006,182 A | 10/1911 | Cousin |
| 1,022,112 A | 4/1912 | Smith |
| 1,031,095 A | 7/1912 | Smith |
| 1,534,964 A | 4/1925 | Kahnweiler |
| 2,086,631 A | 7/1937 | Munro |
| 3,830,202 A | 8/1974 | Garrison |
| 4,907,537 A | 3/1990 | Shirk |
| RE34,352 E | 8/1993 | Markham |
| 5,367,986 A | 11/1994 | O'Rourke et al. |
| 5,553,570 A | 9/1996 | VanNatter, III et al. |
| 5,595,142 A | 1/1997 | Chill |
| 5,647,302 A | 7/1997 | Shipp |
| 5,792,470 A | 8/1998 | Baumgardner, Sr. |
| 5,799,616 A | 9/1998 | McClung, III |
| 5,819,690 A | 10/1998 | Brown |
| 5,832,877 A | 11/1998 | Markham |
| 5,853,757 A | 12/1998 | Durand et al. |

(Continued)

FOREIGN PATENT DOCUMENTS

GB      2253329 A      9/1992

OTHER PUBLICATIONS

Indestructible Dog Bionic Bone dated Apr. 2, 2015 (accessed Jun. 6, 2017 via Internet Archive Wayback Machine (https://web.archive.org/)).

*Primary Examiner* — Yvonne R Abbott-Lewis
(74) *Attorney, Agent, or Firm* — Tillman Wright, PLLC; James D. Wright; David R. Higgins

(57) ABSTRACT

A semi-hollow ball for pet play, including an outer shell having a plurality of perforations therethrough, a central inner core disposed in the perforated outer shell, and a plurality of elongate airflow structures extending disposed between, and extending from at least one of, the central inner core and the perforated outer shell. The elongate airflow structures are spaced apart from one another so as to form airflow passages therebetween. The airflow passages are in fluid communication with the perforations in the outer shell such when carried in the mouth of a pet, air passes into the ball through one or more of the perforations, through one or more of the airflow passages, and out of the ball through one or more of the perforations.

20 Claims, 6 Drawing Sheets

(56) References Cited

U.S. PATENT DOCUMENTS

| | | |
|---|---|---|
| 5,865,146 A | 2/1999 | Markham |
| 5,895,662 A | 4/1999 | Meyer |
| 5,965,182 A | 10/1999 | Lindgren |
| 6,050,224 A | 4/2000 | Owens |
| 6,098,571 A * | 8/2000 | Axelrod ............... A01K 15/025 119/707 |
| D431,886 S | 10/2000 | Owens |
| D432,741 S | 10/2000 | Owens |
| 6,148,771 A | 11/2000 | Costello |
| 6,186,096 B1 | 2/2001 | Miller |
| 6,217,408 B1 | 4/2001 | Willinger |
| 6,237,538 B1 | 5/2001 | Tsengas |
| 6,405,681 B1 | 6/2002 | Ward |
| 6,415,741 B2 | 7/2002 | Suchowski et al. |
| 6,427,634 B1 | 8/2002 | Mann |
| 6,439,166 B1 | 8/2002 | Markham |
| 6,484,671 B2 | 11/2002 | Herrenbruck |
| 6,526,912 B1 | 3/2003 | Ottoson |
| 6,578,527 B1 * | 6/2003 | Mathers ............... A01K 15/025 119/707 |
| 6,601,539 B1 | 8/2003 | Snook |
| 6,609,944 B1 | 8/2003 | Viola |
| 6,623,328 B1 | 9/2003 | Theel |
| 6,634,318 B1 | 10/2003 | Rucker |
| 6,681,721 B1 | 1/2004 | Buschy |
| 6,688,258 B1 | 2/2004 | Kolesar |
| 6,840,197 B1 | 1/2005 | Trompke |
| D505,233 S | 5/2005 | Viola |
| 6,899,059 B1 | 5/2005 | Crane et al. |
| D511,029 S * | 10/2005 | Willinger ..................... D21/713 |
| D513,816 S | 1/2006 | Crane et al. |
| 6,990,762 B1 | 1/2006 | Muday et al. |
| 7,144,293 B2 | 12/2006 | Mann et al. |
| D540,496 S * | 4/2007 | Axelrod ....................... D30/160 |
| 7,367,283 B2 * | 5/2008 | Aboujaoude ........ A01K 15/025 119/702 |
| 7,389,748 B2 | 6/2008 | Shatoff et al. |
| 7,426,903 B2 | 9/2008 | Simon |
| 7,600,488 B2 | 10/2009 | Mann |
| 7,644,684 B2 | 1/2010 | Ritchey |
| 7,762,214 B2 | 7/2010 | Ritchey |
| D626,706 S | 11/2010 | Ragonetti |
| 7,823,542 B2 | 11/2010 | Freeman |
| 8,225,747 B2 | 7/2012 | Markham et al. |
| 8,231,920 B2 | 7/2012 | Axelrod et al. |
| 8,413,612 B2 | 4/2013 | Smith |
| 8,479,687 B2 | 7/2013 | Anderson et al. |
| D688,012 S | 8/2013 | Canello et al. |
| 8,522,725 B1 | 9/2013 | Moore |
| 8,640,647 B2 | 2/2014 | Dotterer |
| D710,554 S | 8/2014 | Byrne |
| 8,875,662 B2 | 11/2014 | Angle et al. |
| 8,904,966 B2 | 12/2014 | Kolozsvari et al. |
| D721,210 S | 1/2015 | Diskin |
| 8,935,992 B2 | 1/2015 | Axelrod et al. |
| 9,027,512 B2 | 5/2015 | Prange et al. |
| 9,107,390 B1 | 8/2015 | Day |
| 9,498,433 B1 | 11/2016 | Mullin et al. |
| 9,844,703 B1 * | 12/2017 | Gupta ..................... A63B 39/00 |
| D822,295 S * | 7/2018 | Woods .......... D30/160 |
| 2002/0139708 A1 | 10/2002 | Lien |
| 2003/0079693 A1 | 5/2003 | Jager |
| 2004/0244719 A1 | 12/2004 | Jager |
| 2006/0260560 A1 | 11/2006 | Renforth et al. |
| 2009/0078214 A1 | 3/2009 | Mann |
| 2010/0224138 A1 | 9/2010 | Axelrod et al. |
| 2011/0256208 A1 | 10/2011 | Ling |
| 2012/0111284 A1 | 5/2012 | Berger |
| 2012/0279459 A1 * | 11/2012 | Angle ................. A01K 15/025 119/707 |
| 2013/0036988 A1 | 2/2013 | Lai |
| 2013/0047932 A1 | 2/2013 | Salmon Hyder et al. |
| 2013/0092097 A1 | 4/2013 | Cooper |
| 2013/0142936 A1 | 6/2013 | Stern et al. |
| 2014/0345532 A1 | 11/2014 | Valle |
| 2015/0164047 A1 | 6/2015 | Watts et al. |
| 2015/0237829 A1 | 8/2015 | Tsengas |
| 2015/0237830 A1 * | 8/2015 | Sternal ................. A01K 15/027 119/702 |
| 2015/0373950 A1 | 12/2015 | Spring |
| 2016/0037751 A1 | 2/2016 | Byrne |
| 2016/0113243 A1 | 4/2016 | Mullin et al. |
| 2016/0242391 A1 * | 8/2016 | Stone ................... A01K 15/025 |
| 2016/0273738 A1 * | 9/2016 | Wolfinbarger ......... A63B 41/00 |
| 2018/0000048 A1 * | 1/2018 | Stone ................... A01K 15/025 |
| 2018/0098524 A1 * | 4/2018 | Zhang ................. A01K 15/025 |

* cited by examiner

SEMI-HOLLOW BALL WITH INTERNAL SUPPORT STRUCTURE AND AIRFLOW PASSAGES

CROSS-REFERENCE TO RELATED APPLICATION

The present application is a U.S. nonprovisional patent application of, and claims priority under 35 U.S.C. § 119(e) to, U.S. provisional patent application Ser. No. 62/280,810 filed Jan. 20, 2016, which provisional patent application is incorporated by reference herein.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE PRESENT INVENTION

Field of the Present Invention

The present invention relates generally to balls for pet play, and, more particularly, to a perforated round ball with inner-core, is designed to allow for increased airflow and easier breathing for a dog, when a dog holds the ball in its mouth.

Background

Normal breathing for a dog is through its nose. When hunting or exercising, a dog will change to circular breathing, where the dog breathes using both its nose and mouth. Blockage in the mouth, such as when a dog carries a typical ball, reduces the dog's breathing airway passage, thus making it more difficult for the dog to breathe, such as during ball fetch play and exercise. Tennis ball dangers tend to be most common in larger breeds like German Shepherds, Golden Retrievers and Labrador Retrievers, for such breeds are more likely to enjoy catching and playing intently with balls, and their mouths are large enough to entirely wrap around a tennis ball. Once a tennis ball or the like gets stuck in a dog's throat, it blocks off the dog's breathing. In fact, if not taken care of quickly, the dog may not survive. Thus, a need exists for a toy which allows for a dog to breathe freely while carrying the toy during play.

SUMMARY OF THE PRESENT INVENTION

Broadly defined, the present invention according to one aspect is a semi-hollow ball for pet play, including: an outer shell having a plurality of perforations therethrough; a central inner core disposed in the perforated outer shell; and a plurality of elongate airflow structures extending disposed between, and extending from at least one of, the central inner core and the perforated outer shell; wherein the elongate airflow structures are spaced apart from one another so as to form airflow passages therebetween, the airflow passages being in fluid communication with the perforations in the outer shell such when carried in the mouth of a pet, air passes into the ball through one or more of the perforations, through one or more of the airflow passages, and out of the ball through one or more of the perforations.

In a feature of this aspect, an exterior of the outer shell has teeth grooves which are shaped to receive dog teeth such that a dog may grip the ball with its teeth securely.

In another feature of this aspect, the elongate airflow structures are physically connected to, or integrally formed with, an exterior of the central inner core. In further features, the elongate airflow structures are also physically connected to an interior of the perforated outer shell; the elongate airflow structures are soft protuberances; and/or the elongate airflow structures are not connected to perforated outer shell, but may be compressed against an interior of the outer shell.

In another feature of this aspect, the elongate airflow structures are physically connected to, or integrally formed with, an interior of the perforated outer shell.

In another feature of this aspect, the central inner core is a solid object.

In another feature of this aspect, the central inner core is a hollow object. In further features, the central inner core includes a sound emitter device disposed therein; and/or the elongate airflow structures are hollow.

In another feature of this aspect, each of the perforations is at least one-eighth inch across at its smallest point. In further features, each of the perforations is at least one-fourth inch across at its smallest point; and/or each of the perforations is at least three-eighths inch across at its smallest point.

In another feature of this aspect, the perforated outer shell is made of a first material, the central inner core is made of a second material, and the elongate airflow structures are made of a third material, and wherein at least one of the first, second, and third materials is different from the other two materials. In further features, each of the first, second, and third materials is different from the other two materials; and/or the different material has a different durometer than the other two materials.

In another feature of this aspect, an adjustment mechanism is disposed in the perforated outer shell, and wherein the adjustment mechanism is arranged to change the geometry of the airflow passages through the ball. In further features, the adjustment mechanism includes a knob that may be rotated to change the geometry; the adjustment mechanism is arranged to increase and/or decrease the size of the central inner core; and/or the adjustment mechanism is arranged to increase and/or decrease the size of the elongate airflow structures.

In another feature of this aspect, the perforated outer shell includes at least two sections that may be at least partially separated from each other such that the central inner core and/or the airflow structures may be removed and replaced.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Further features, embodiments, and advantages of the present invention will become apparent from the following detailed description with reference to the drawings, wherein.

DETAILED DESCRIPTION

Figure 1:
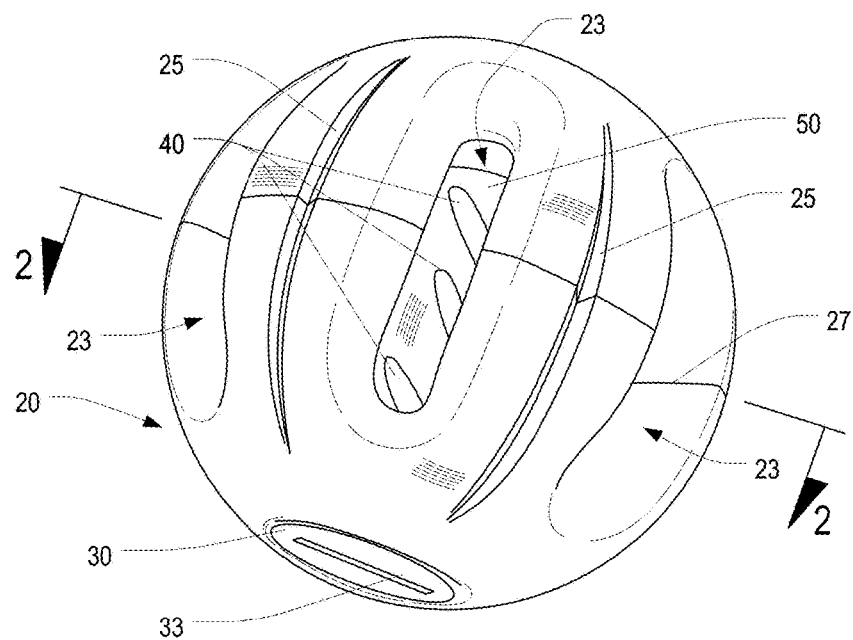
FIG. 1 is an isometric view of a semi-hollow ball with an internal support structure and airflow passages in accordance with one or more preferred embodiments of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers," "a picnic basket having crackers without cheese," and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, in which like numerals represent like components throughout the several views, one or more preferred embodiments of the present invention are next described. The following description of one or more preferred embodiment(s) is merely exemplary in nature and is in no way intended to limit the invention, its application, or uses.

FIG. 1 is an isometric view of a semi-hollow ball 10 with an internal support structure and airflow passages in accordance with one or more preferred embodiments of the present invention. The ball includes a perforated outer shell 20, an inner core 50, and airflow structures 40 located between the outer shell 20 and the inner core 50. The outer shell 20 contains breathing perforations 23 which allows the air to flow into and through the airflow passages formed between the airflow structures 40. In one or more preferred embodiments, the perforations 23 are elongated but may also be circular or oval and vary in size. In at least some preferred embodiments, the perforations 23 are somewhat slot-shaped with round ends. The airflow structures 40 between the outer shell 20 and inner core 50 assist in structurally retaining the ball's spherical shape while still providing airflow passages to assist in the dog's breathing when it is carrying the ball 10. The perforations 23 are preferably at least one-eighth inch across at their smallest point, are more preferably at least one-fourth inch across at their smallest point, and are still more preferably at least three-eighths inch across at their smallest point. In some embodiments, the perforations 23 are much larger.

Figure 2:
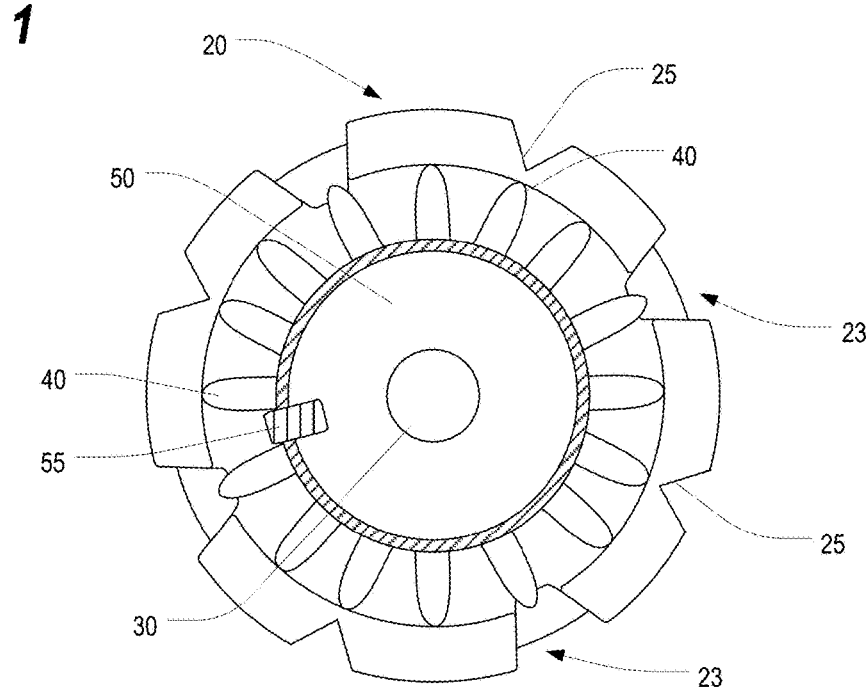
FIG. 2 is a top cross-sectional view of the ball of FIG. 1, taken along line 2-2.

FIG. 2 is a top cross-sectional view of the ball 10 of FIG. 1, taken along line 2-2. In one or more preferred embodiments of the present invention, the airflow structures 40 contain one or more airflow adjuster mechanisms 30 located on or near the surface of the outer shell 20 for manually adjusting the size or shape of the inner core 50 and/or some or all of the airflow structures 40 in order to change the geometry of airflow paths through the interior of the ball 10. Adjusting the airflow can increase or decrease the volume of the airflow and further may alter the velocity of the ball when thrown, assist in control of the throw, change the throw path, or vary the flight distance of the ball 10. In the embodiment of FIG. 1, the adjuster mechanisms 30 include a knob 33 that may be turned (rotated) in order to increase and/or decrease the size of the inner core 50 and/or the airflow structures 40, thereby affecting the size of the airflow paths. However, other mechanisms may additionally or alternatively be utilized.

In some embodiments of the ball 10, the airflow structures 40 may include soft protuberances attached to the inner core and extending outward, as shown in FIG. 2. However, it will be appreciated that such protuberances may additionally or alternatively be attached to the outer shell 20 and arranged to extend inward toward the inner core 50. Furthermore, in various embodiments, the airflow structures 40 may include solid spokes or other protuberances 140, as shown in FIG. 4, that fit tightly between the inner core 50 and the outer shell 20.

In at least some embodiments, angled teeth grooves 25 are arranged in the surface of the outer shell 20. The angled teeth grooves 25 are specifically designed as holding locations for the points of a dog's teeth, and particularly the dog's canine teeth 75, wherein the teeth grooves 25 receive the tips of the teeth 75 of the dog 70 when the dog bites down on the ball during fetch play. The grooves 25 thus help the dog 70 better retain the ball 10 in its mouth. This may be particularly useful when the ball is wet from water or dog saliva, wherein the angled teeth grooves 25 help the dog 70 grasp the slippery ball 10 with their teeth 75 while running or exercising. It will be appreciated that grooves having various cross-sections other than the V-shaped grooves 25 shown in FIG. 1 may additionally or alternatively be utilized. Furthermore, in various embodiments, additional structures may be provided on the surface of the ball 10 to further assist in this regard.

Figure 3:
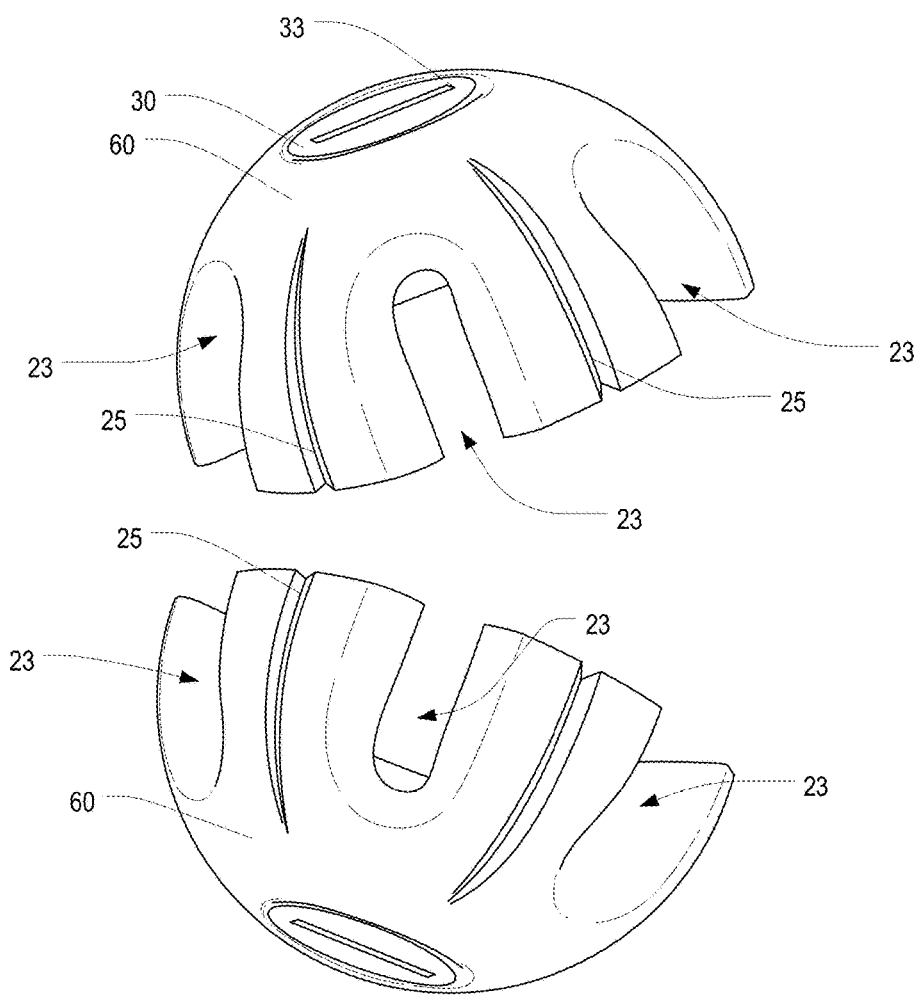
FIG. 3 is an exploded view of the ball of FIG. 1, shown with the inner core removed.

FIG. 3 is an exploded view of the outer shell 20 of the ball 10 of FIG. 1, shown with the inner core 50 removed. In some preferred embodiments, the outer shell 20 of the ball 10 is made by attaching two half domes 60 together at the center line 27 of the outer shell 20. In at least some of these embodiments, the two half domes 60 may be joined and separated by the user and that the inner core 50 may thus be removable. For example, corresponding threads may be provided on the interiors of the half domes 60 such that they may be screwed together, or the adjuster mechanisms 30 may be used to hold the two half domes together 60. In some preferred embodiments, the inner core 50 may also be hollow, allowing for a sound emitter device 55, such as an air squeaker or other sound emitter, to be arranged therein.

Figure 4:
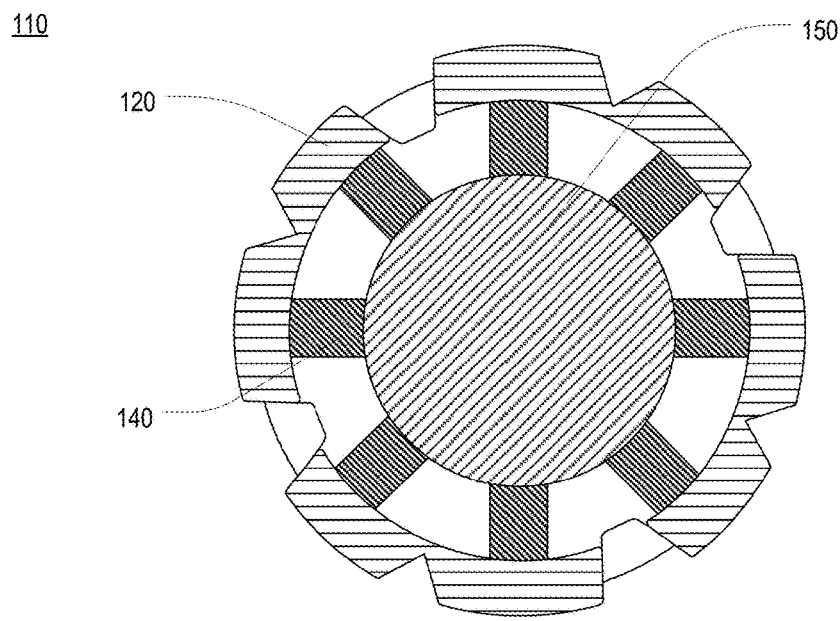
FIG. 4 is a cross-sectional view of another semi-hollow ball with an internal support structure and airflow passages in accordance with one or more preferred embodiments of the present invention.

FIG. 4 is a cross-sectional view of another semi-hollow ball 110 with an internal support structure and airflow passages in accordance with one or more preferred embodiments of the present invention. Similar to FIG. 1, the ball 110 includes a perforated outer shell 120, an inner core 150, and airflow structures 140 located between the outer shell 120 and the inner core 150. However, in this embodiment, both the inner core 150 and the airflow structures 140 are solid structures, and the airflow structures 140 are tightly disposed between the inner core 150 and outer shell 120.

Figure 5:
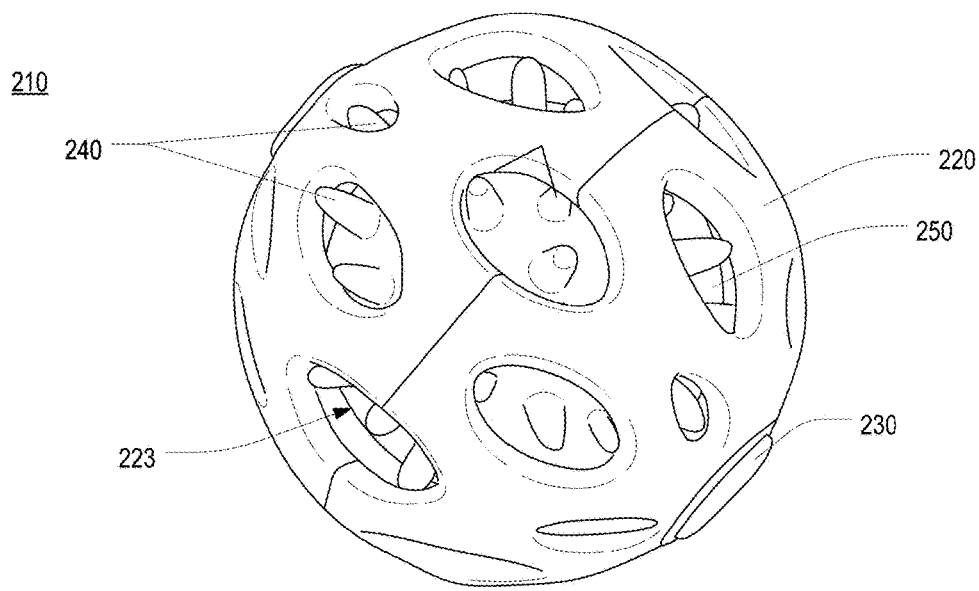
FIG. 5 is an isometric view of another semi-hollow ball with an internal support structure and airflow passages in accordance with one or more preferred embodiments of the present invention.

FIG. 5 is an isometric view of another semi-hollow ball 210 with an internal support structure and airflow passages in accordance with one or more preferred embodiments of the present invention. Similar to FIG. 1, the ball 210 includes a perforated outer shell 220, an inner core 250, and airflow structures 240 located between the outer shell 220 and the inner core 250. However, the outer shell 220 of the ball 210 contains smaller oval and/or circular perforations 223.

Figure 6:
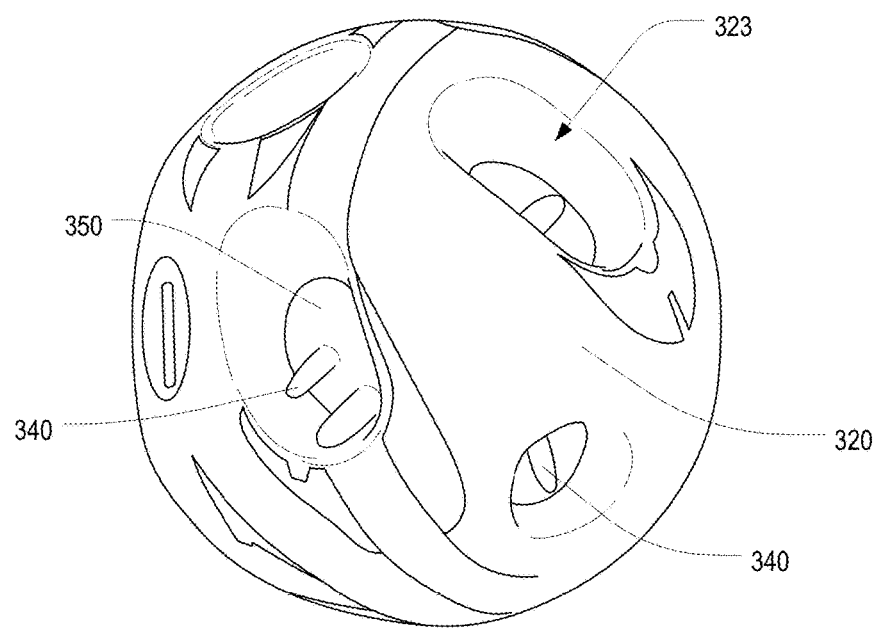
FIG. 6 is an isometric view of another semi-hollow ball with an internal support structure and airflow passages in accordance with one or more preferred embodiments of the present invention.

FIG. 6 is an isometric view of another semi-hollow ball 310 with an internal support structure and airflow passages in accordance with one or more preferred embodiments of the present invention. Similar to FIG. 1, the ball 310 includes a perforated outer shell 320, an inner core 350, and airflow structures 340 located between the outer shell 320 and the inner core 350. More particularly, the outer shell 320 of the ball 310 of FIG. 6 includes perforations 323 of various sizes and/or shapes.

The outer shell, inner core, and airflow structures in each of the various balls 10,110,210,310 may be constructed or made of different materials, such as rubber, nylon, TPE, or the like. By utilizing different materials for separate structures in the same ball, variations may be introduced to alter the performance characteristics of the ball 10,110,210,310 for bounce, weight, durometer and flight distance.

Figure 7:
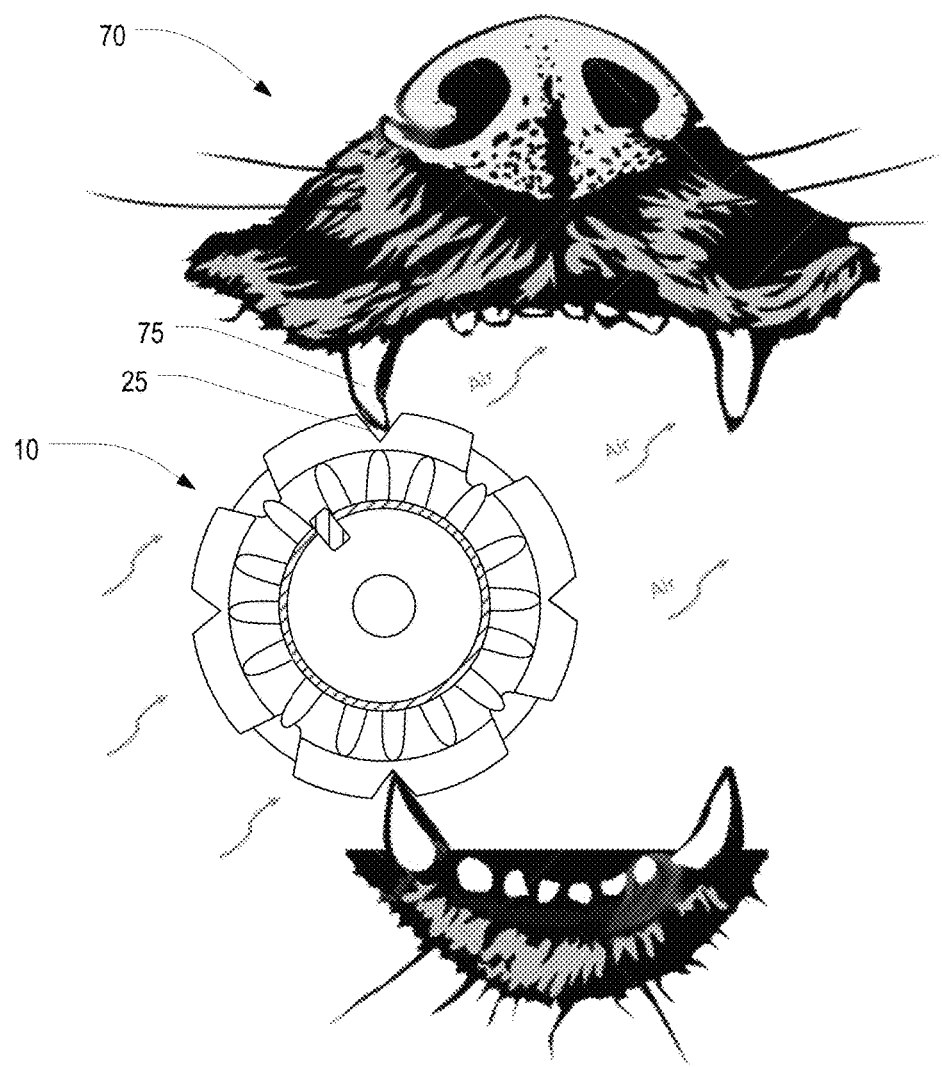
FIG. 7 is an illustration of a dog carrying the ball of FIG. 1 with the ball shown in the cross-section view of FIG. 2.

FIG. 7 is an illustration of a dog 70 carrying the ball 10 of FIG. 1 with the ball 10 shown in the cross-section view of FIG. 2. The teeth 75 are shown fitting into the angled teeth grooves 25 of FIG. 1.

Figure 8:
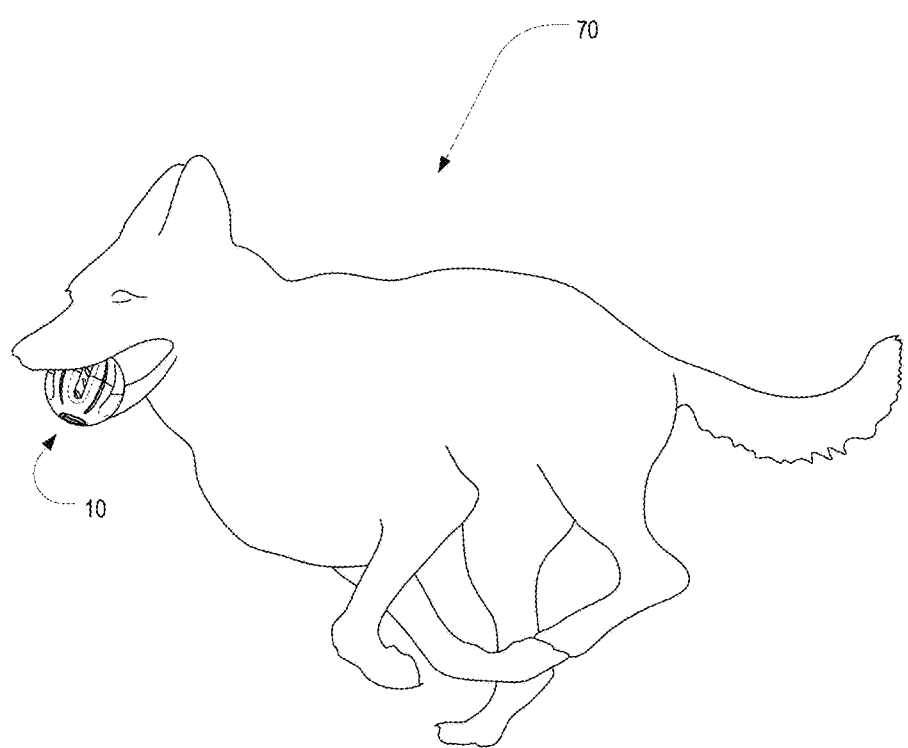
FIG. 8 is an illustration of a ball from FIG. 1, being held by a dog while running.

FIG. 8 is an illustration of the ball 10 from FIG. 1 being held by a dog 70 while running. When a dog 70 is playing with the ball 10, as show in FIGS. 7 and 8, the airflow structures 40,140,240,340 allow air to pass through the ball 10,110,210,310 while it is being held by a dog 70 in its mouth. Having a dog play fetch with the ball 10,110,210,310 containing the airflow structures 40,140,240,340 allows for reduced gasping for air when the dog is carrying the ball in its mouth and reduces the liability of choking on the ball 10,110,210,310. With the increased airflow and thus improved breathing, the dog gets more oxygen during running and other exercise while holding the ball 10,110,210,310 in its mouth. Also, when a dog is swimming and holding the ball 10,110,210,310 with its mouth above the water, there is reduced constriction in breathing and reduced coughing.

Based on the foregoing information, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claims appended hereto and the equivalents thereof.

What is claimed is:

1. A semi-hollow ball for pet play, comprising:
   (a) an outer shell having a plurality of perforations therethrough;
   (b) a central inner core disposed in the perforated outer shell; and
   (c) a plurality of elongate airflow structures extending disposed between, and extending from at least one of, the central inner core and the perforated outer shell;
   (d) wherein the elongate airflow structures are spaced apart from one another so as to form airflow passages therebetween, the airflow passages being in fluid communication with the perforations in the outer shell such when carried in the mouth of a pet, air passes into the ball through one or more of the perforations, through one or more of the airflow passages, and out of the ball through one or more of the perforations.

2. The semi-hollow ball of claim 1, where an exterior of the outer shell has teeth grooves which are shaped to receive dog teeth such that a dog may grip the ball with its teeth securely.

3. The semi-hollow ball of claim 1, wherein the elongate airflow structures are physically connected to, or integrally formed with, an exterior of the central inner core.

4. The semi-hollow ball of claim 3, wherein the elongate airflow structures are also physically connected to an interior of the perforated outer shell.

5. The semi-hollow ball of claim 3, wherein the elongate airflow structures are soft protuberances.

6. The semi-hollow ball of claim 3, wherein the elongate airflow structures are not connected to perforated outer shell, but may be compressed against an interior of the outer shell.

7. The semi-hollow ball of claim 1, wherein the elongate airflow structures are physically connected to, or integrally formed with, an interior of the perforated outer shell.

8. The semi-hollow ball of claim 1, wherein the central inner core is a solid object.

9. The semi-hollow ball of claim 1, wherein the central inner core is a hollow object and/or the elongate airflow structures are hollow.

10. The semi-hollow ball of claim 9, wherein the central inner core includes a sound emitter device disposed therein.

11. The semi-hollow ball of claim 1, wherein each of the perforations is at least one-eighth inch across at its smallest point.

12. The semi-hollow ball of claim 11, wherein each of the perforations is at least one-fourth inch across at its smallest point.

13. The semi-hollow ball of claim 12, wherein each of the perforations is at least three-eighths inch across at its smallest point.

14. The semi-hollow ball of claim 1, wherein the perforated outer shell is made of a first material, the central inner core is made of a second material, and the elongate airflow structures are made of a third material, and wherein at least one of the first, second, and third materials is different from the other two materials.

15. The semi-hollow ball of claim 14, wherein each of the first, second, and third materials is different from the other two materials.

16. The semi-hollow ball of claim 14, wherein the different material has a different durometer than the other two materials.

17. The semi-hollow ball of claim 1, wherein an adjustment mechanism is disposed in the perforated outer shell, and wherein the adjustment mechanism is arranged to change the geometry of the airflow passages through the ball.

18. The semi-hollow ball of claim 17, wherein the adjustment mechanism includes a knob that may be rotated to change the geometry.

19. The semi-hollow ball of claim 17, wherein the adjustment mechanism is arranged to increase and/or decrease the size of the central inner core and/or the size of the elongate airflow structures.

20. The semi-hollow ball of claim 1, wherein the perforated outer shell includes at least two sections that may be at least partially separated from each other such that the central inner core and/or the airflow structures may be removed and replaced.

* * * * *